United States Patent [19]

Woods

[11] Patent Number: 5,442,866
[45] Date of Patent: Aug. 22, 1995

[54] SURVEYING RULE ASSEMBLY, AND METHODS OF CONSTRUCTING AND UTILIZING SAME

[76] Inventor: William E. Woods, 2650 Lovelace Rd., Mikado, Mich. 48745

[21] Appl. No.: 903,356

[22] Filed: Jun. 24, 1992

[51] Int. Cl.⁶ .............................................. G01B 3/10
[52] U.S. Cl. .......................................... 33/760; 33/770; 33/293
[58] Field of Search .......... 33/1 G, 1 H, 1 CC, 1 LE, 33/755–770, 293, 296, 339, 294; 248/904, 542, 311.2, 313, 316.1, 218.4, 219.4, 231.7, 314, 230, 231

[56] References Cited

U.S. PATENT DOCUMENTS

| | | | |
|---|---|---|---|
| 1,106,152 | 8/1914 | McIntosh | 33/761 X |
| 1,654,164 | 12/1927 | Eldridge | 33/755 X |
| 1,684,566 | 9/1928 | Winkler | 33/759 |
| 1,978,033 | 10/1934 | Suppes | 248/230 X |
| 2,441,734 | 5/1948 | Hyning | 248/230 |
| 3,105,303 | 10/1963 | Frizzell | 33/294 |
| 4,200,984 | 5/1980 | Fink | 33/755 X |
| 4,880,232 | 11/1989 | Lang | 33/760 X |
| 4,967,482 | 11/1990 | Hoover et al. | 33/760 |
| 5,113,596 | 5/1992 | Meyers | 33/759 X |

*Primary Examiner*—Alvin Wirthlin
*Attorney, Agent, or Firm*—Weintraub Duross & Brady

[57] ABSTRACT

An assembly for use by a surveyor having a ruler and an apparatus for securing the ruler to a surveyor's pole. The ruler has a retractable tape and a belt clip. The apparatus for securing the ruler to a pole includes a cradle sized to retain the ruler, a stop member, a planar wall member and attachment members for securing the apparatus to a pole. By securing the ruler to a pole, a single person may complete measurements which previously required two people. The tape of the ruler includes measurements which are inverted with respect to the tenth of a foot for easier reading.

10 Claims, 2 Drawing Sheets

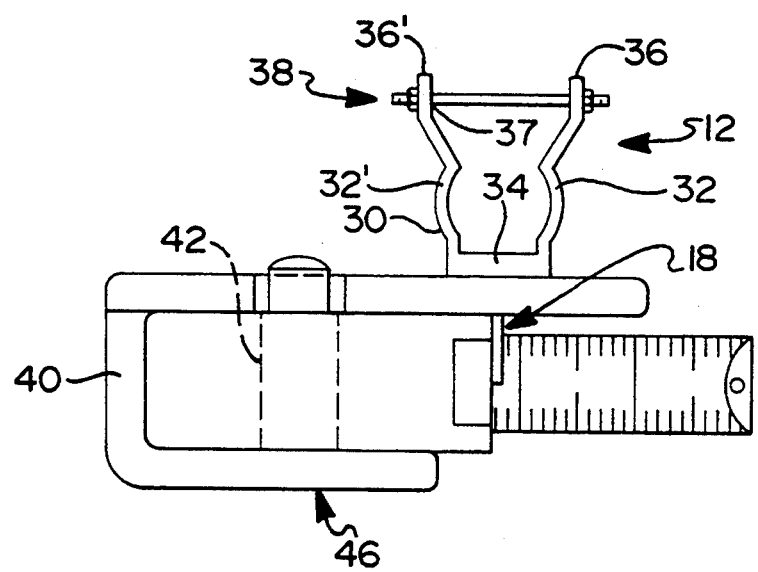
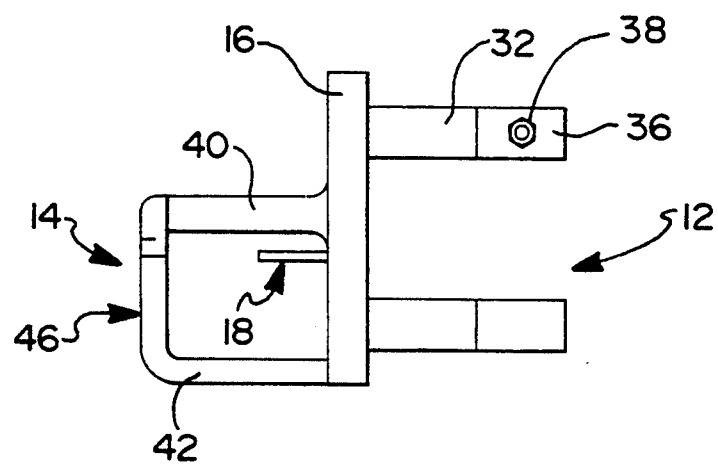

000
SURVEYING RULE ASSEMBLY, AND METHODS OF CONSTRUCTING AND UTILIZING SAME

BACKGROUND OF THE INVENTION

1. Field of the Invention

The present invention relates to a rule assembly including means for securing a ruler being adapted to releasably attach to a surveyor's pole for ease of measurements. More particularly, the assembly includes an apparatus for holding a ruler, and particularly a retractable ruler, in a housing with a clip member. The clip member is normally used to attach the ruler to the belt of a user. The apparatus comprising a securement means includes a clip acceptance portion to secure the ruler to the securement means. The means for securement releasably attaches to the surveying pole centering the tape to the pole for accurate measurements.

Surveying consists of two phases: gathering data in the field, and analyzing and utilizing this data at a later time. Field data must be recorded accurately, legibly and without ambiguity. Surveying equipment normally includes tape, plumb bobs, range poles, taping pins, levels, transits, theodolites and various types of electronic measuring equipment. The bulk of the surveying work in the United States is done with the tape, transit and level. Surveying tapes are commonly divided into one foot intervals, graduated into tenths and hundredths of a foot. Range poles are round or hexagonal poles ranging from six to eight feet in length. The pole includes a pointed end for insertion into the ground and can be made of metal, wood or fiberglass. The pole is normally painted alternating one foot intervals of red and white the pole so that it can be easily read. To determine horizontal distances, a calibrated tape is stretched between two points and the tape is read.

2. Description of the Relevant Art

The problem most associated with measuring distances with a retractable ruler is the requirement for more than one person to complete the task, a person to hold the end of the ruler and a person to hold the ruler housing.

In addition, while surveying, even though there is usually more than one person performing a survey, these people are usually at separate locations and not capable of readily helping each other.

It has been known to provide a clip on the ruler for easy transportation of the ruler on the belt of the user. In addition, it has been known to provide a reinforcing member attachable to a belt to accept the clip on the ruler. However, a means for securing a ruler to a pole has not been known in the relevant art.

SUMMARY OF THE INVENTION

The present invention may suitably comprise an assembly for a surveying pole, the assembly comprising a ruler and an apparatus to retain the ruler. The ruler is of the type having a retractable tape disposed in a housing, the housing having a belt clip formed thereon. The tape preferably includes measurements which are inverted, or opposite from the normal arrangement of the measurements.

In a preferred embodiment the apparatus to retain the ruler includes a planar wall, a cradle formed to the planar wall and attachment means for securing the apparatus to a pole.

It is an object of the present invention to provide an assembly for a surveying pole.

It is a further object of the present invention to provide an apparatus for retaining a ruler on a surveying pole.

It is a still further object of the present invention to provide an apparatus molded in one piece.

The above and further objects, details and advantages of the invention will become apparent from the following detailed description, when read in conjunction with the accompanying drawings, in which:

BRIEF DESCRIPTION OF THE DRAWINGS

FIG. 4 illustrates a top plan view of an apparatus in accordance with the present invention;

FIG. 5 illustrates a side view of an apparatus in accordance with the present invention.

DETAILED DESCRIPTION OF THE PREFERRED EMBODIMENTS

Figure 1:
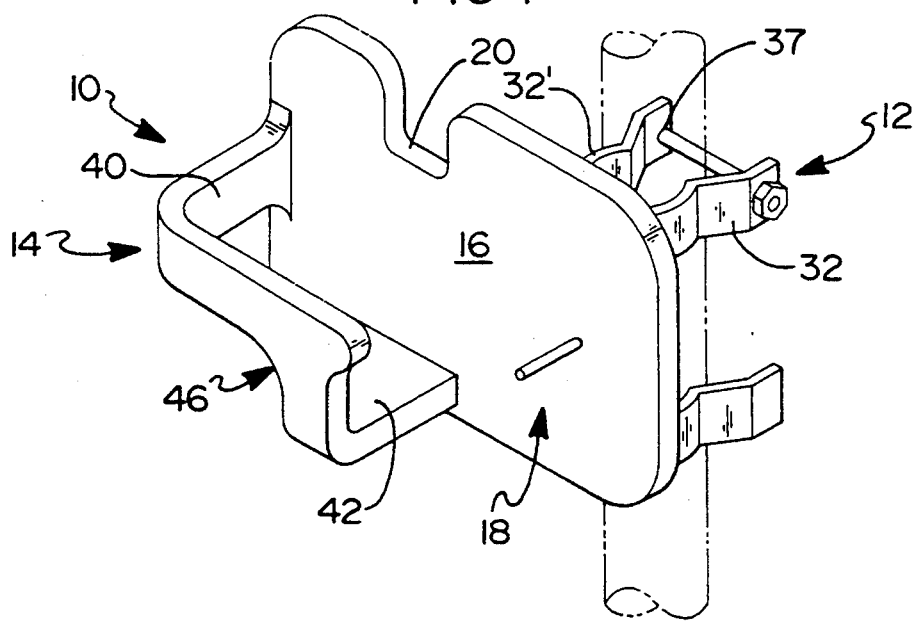
FIG. 1 illustrates a perspective view of an apparatus in accordance with the present invention.

As seen in FIG. 1, an apparatus 10 for retaining a retractable tape ruler 5 on a pole 1 comprises means for attaching 12, a cradle 14 and a planar wall member 16. The planar wall member 16 may be provided in various thicknesses depending upon the amount of reinforcement, such as ribs (not shown) required for a stiff member. The planar wall 16 has a front, to which the cradle 14 is secured, and a back, to which the means 12 for attaching to a pole 1 is secured.

Figure 2:
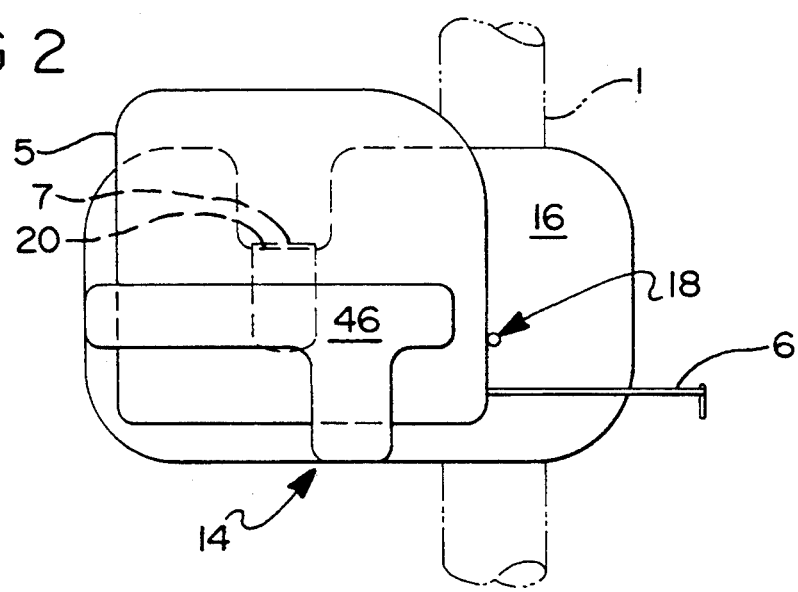
FIG. 2 illustrates a front plan view of an apparatus in accordance with the present invention.

As best seen in FIG. 2, the ruler 5, having a retractable tape 6 disposed therein and a belt clip 7 formed thereon the housing, fits into the cradle 14 such that the means for stopping 18 prevents the ruler 5 from sliding out of the apparatus 10 when the retractable tape 6 is extracted from the ruler 5. In addition, the means 18 for stopping permits centering of the ruler 5 on pole 1. The means 18 for stopping is aligned with the central longitudinal axis of pole 1, such that accurate measurements can be easily made.

Figure 3:
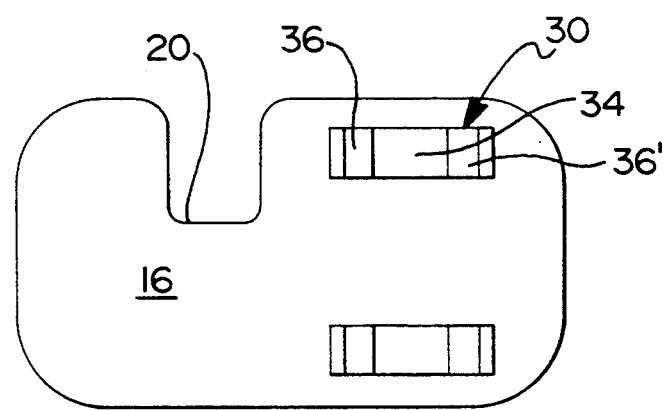
FIG. 3 illustrates a rear plan view of an apparatus in accordance with the present invention.

As best seen in FIG. 3, the planar wall member 16 has formed thereon a belt clip cut-out portion 20 adapted to accept the belt clip 7 of the retractable tape ruler 5. The cut-out portion 20 is sized to allow the belt clip 7 on the ruler 5 to fit therein. The cut-out portion 20 may optionally comprise a portion of the planar wall 16 which is thin (not shown) and accepts the clip 7 thereon.

As shown in FIG. 4, the means 12 for attaching comprises at least one substantially U-shaped member 30 having two arms 32, 32' and a base 34. The arms 32 include, at the distal ends 36, 36' apertures 37, 37' for accepting means 38 for fastening. Preferably, the means 38 for fastening comprises a bolt, or screw, and corresponding nut which can be tightened to securely clamp the pole 1 between the arms 32, 32'. As shown in (FIG. 5) only one means 12 for attaching includes apertures and a means for fastening. However, this is a preferred arrangement and is not intended to show that only one means for attaching requires means 12 for fastening 38. The base 34 is secured to the back of the planar wall 16. Preferably, the base 34 is integrally molded with the planar wall 16. However, separate means 12 for attaching may be secured to the planar wall 16 by any known means in the art.

The cradle 14 comprises a first end portion 40, a bottom portion 42 and an L-shaped first partition member 46 substantially parallel to and spaced apart from the planar wall 16. The cradle 14 is sized to snugly receive a retractable tape ruler 5 between the planar wall 16 and first partition member 46 in width and between the end portion 40 and stop means 18 for stopping in length.

The retractable tape 6 is preferably of the type divided into one-foot intervals graduated into one-tenth and one-hundredth inch intervals. The retractable tape 6 differs from known tapes (subtracting or adding) in that the measurements are inverted to permit easy reading when used in conjunction with the assembly 10. Incremental measurements on retractable tape 6 are inverted as follows. Although a conventional tape would, for example, be marked in increasing one-tenth increments reading "0.1, 0.2, . . . 0.9" from one foot-increment to the next highest foot-increment, such one-tenth increment markings are reversed on retractable tape 6, so that the retractable tape 6 reads "0.9, 0.8 . . . 0.1" from one foot-increment to the next highest foot-increment.

Another important feature resides in the fact that the zero end of the type is remote from the pole regardless of whether the user is righthanded or lefthanded. Also, the tape is preferably, but not necessarily, made so that the numerals thereon face the user when the type is extended to the right by the user.

Although there have been described what is at present considered to be preferred embodiments of the invention, it will be understood that various modifications and variations may be made therein, and the following claims are intended to encompass all such modifications as fall within the true spirit and scope of the invention.

I claim:

1. A ruler-holding assembly for use in conjunction with a surveying pole, the assembly comprising:
   (a) a retractable tape ruler having:
      (1) a housing; and
      (2) a retractable tape, the tape having measurements marked thereon, the tape being disposed within and withdrawable from the housing;
   (b) an apparatus attachable to the pole capable of holding the tape ruler, the apparatus comprising:
      (1) a substantially planar wall member having a front side and a back side;
      (2) means for attaching the apparatus to the pole formed to the back side of the wall member, the means for attaching comprising at least one substantially U-shaped member;
      (3) a cradle connected to the front side of the wall member, the cradle member comprising:
         (i) a first end portion substantially perpendicular to and integral with the wall member;
         (ii) a bottom portion substantially perpendicular to and integral with the wall member;
         (iii) a first partition member substantially parallel to the wall member, the first partition member being substantially perpendicular to and integral with the first end portion and the bottom portion.

2. The assembly of claim 1, wherein:
said planar wall member, said first end portion and said first partition member form a substantially U-shape with the side opposite said first end portion being open.

3. The assembly of claim 2, wherein:
said planar wall member, said bottom portion and said first partition member form a substantially U-shape with the top opposite said bottom portion being open.

4. The assembly of claim 1, further comprising:
means for stopping the housing from forwardly leaving the cradle, the means for stopping being formed to the planar wall member and being positioned to abut said ruler housing when said ruler is positioned in said cradle.

5. The assembly of claim 1, wherein the at least one clamping member each have means for fastening formed therewith to secure the at least one clamping member around the pole.

6. The assembly of claim 1, wherein:
said measurements marked on said tape comprise at least some incremental measurements which are inverted.

7. A ruler-holding apparatus attached to a surveying pole, the apparatus comprising:
   (a) a substantially U-shaped cradle member;
   (b) means for securing a retractable tape ruler having a belt clip for securing the ruler to the cradle member:
   (c) means for attaching the cradle member to the pole; and
   (d) means for preventing the ruler from sliding forwardly out of the cradle.

8. The apparatus of claim 7, wherein:
the means for attaching comprises at least one substantially U-shaped pole gripping means.

9. The apparatus of claim 8, wherein:
said attaching means is secured to a back side of a substantially planar wall member and said cradle is integral with a front side of said wall member.

10. The apparatus of claim 9, wherein:
the at least one substantially U-shaped pole gripping means has a pair of arms, each said arm includes an aperture at the distal end for accommodating a fastening means for drawing said distal ends of said arms together for securing said apparatus to said pole.

* * * * *